(12) United States Patent
Shimamura et al.

(10) Patent No.: US 7,969,993 B2
(45) Date of Patent: Jun. 28, 2011

(54) PRESENCE DISPLAY SYSTEM AND GATEWAY APPARATUS

(75) Inventors: Koichi Shimamura, Tokyo (JP); Jota Nakatsuma, Tokyo (JP); Seiichi Kawakami, Tokyo (JP); Takenori Sekiya, Tokyo (JP)

(73) Assignee: Vodafone Group PLC, Berkshire (GB)

( * ) Notice: Subject to any disclaimer, the term of this patent is extended or adjusted under 35 U.S.C. 154(b) by 831 days.

(21) Appl. No.: 10/596,465

(22) PCT Filed: Nov. 11, 2004

(86) PCT No.: PCT/JP2004/016731
§ 371 (c)(1),
(2), (4) Date: Jun. 14, 2006

(87) PCT Pub. No.: WO2005/067274
PCT Pub. Date: Jul. 21, 2005

(65) Prior Publication Data
US 2008/0316939 A1    Dec. 25, 2008

(30) Foreign Application Priority Data
Dec. 26, 2003 (JP) .................................. 2003-432498

(51) Int. Cl.
H04L 12/56 (2006.01)
(52) U.S. Cl. ......... 370/401; 370/467; 370/507; 370/512
(58) Field of Classification Search .................. 370/350, 370/401, 466, 467, 507, 509, 512
See application file for complete search history.

(56) References Cited

U.S. PATENT DOCUMENTS

| 7,039,037 | B2 * | 5/2006 | Wang et al. ................... 370/349 |
| 7,263,183 | B1 * | 8/2007 | Klein et al. .............. 379/265.09 |
| 7,269,162 | B1 * | 9/2007 | Turner .......................... 370/352 |
| 7,317,716 | B1 * | 1/2008 | Boni et al. ..................... 370/352 |
| 7,382,868 | B2 * | 6/2008 | Moore et al. ............. 379/114.01 |
| 7,406,057 | B2 * | 7/2008 | Isomaki et al. ............... 370/328 |
| 2003/0185232 | A1 * | 10/2003 | Moore et al. .................. 370/465 |

(Continued)

FOREIGN PATENT DOCUMENTS

JP       2003-030371       1/2003

(Continued)

OTHER PUBLICATIONS

Miller, P. et al., XMPP CPIM Mapping, Internet Engineering Task Force, Jun. 21, 2002.

(Continued)

*Primary Examiner* — Jayanti K Patel
*Assistant Examiner* — Bo Hui A Zhu
(74) *Attorney, Agent, or Firm* — Muirhead and Satumelli, LLC

(57) ABSTRACT

Synchronization of presence information is established between different presence services. Presence information of each user is stored on the presence server 27 of the presence display system comprising mobile phones. Presence information of the SIP phone system comprising the SIP phone 29 and the SIPG/W (enterprise side) 30 is stored in the SIPG/W (enterprise side) 30. When presence information of the presence server 27 has changed, the presence server 27 notifies the SIPG/W (enterprise side) 30 of the change in presence information via the SIPG/W (mobile communication network side) 31. Conversely, when presence information of the SIP phone system has changed, the SIPG/W (enterprise side) 30 notifies the presence server 27 of the change in presence via the SIPG/W (mobile communication network side) 31.

15 Claims, 9 Drawing Sheets

U.S. PATENT DOCUMENTS

| | | | |
|---|---|---|---|
| 2003/0193961 A1* | 10/2003 | Moore et al. | 370/401 |
| 2004/0071150 A1* | 4/2004 | Honkala et al. | 370/401 |
| 2004/0151192 A1* | 8/2004 | Trossen | 370/401 |
| 2005/0068167 A1* | 3/2005 | Boyer et al. | 340/531 |

FOREIGN PATENT DOCUMENTS

| | | |
|---|---|---|
| JP | 2003-115795 | 4/2003 |
| JP | 2003-186775 | 7/2003 |
| JP | 2003-250000 | 9/2003 |
| JP | 2003-274440 | 9/2003 |
| JP | 2003-316707 | 11/2003 |
| WO | WO 03/056850 A1 | 7/2003 |
| WO | WO 03/071776 A | 8/2003 |

OTHER PUBLICATIONS

Rosenberg et al., SIP Extensions for Presence, Internet Engineering Task Force, Mar. 2, 2001.

Day et al., Instant Messaging / Presence Protocol Requirments, Internet Engineering Task Force, Feb. 2000.

* cited by examiner

FIG.2A PRESENCE INFORMATION

| |
|---|
| SUBSCRIBER ID:00000123 |
| UID:110styAAAAAAAA1 |
| MSN:09012345678 |
| PASSWORD:hogehoge |
| PERSONAL IDENTIFICATION NUMBER:1234 |
| EMAIL ADDRESS:hoge@jp-t.ne.jp |
| SIP PHONE ADDRESS:hoge@j-phone.com |
| REAL NAME:JIEI FUON |
| NICKNAME:J-PHONE |
| SELECTED COMMUNITY SET:1 |
| STANDBY POLING RECEPTION:OK |
| STANDBY POLING INTERVAL:300 |
| PRESENCE UPDATE TIME:20030514 11:10:05 |
| ABSOLUTE PRESENCE SETTING:1 |
| TEMPORARY COMMENT: |
| ... |

FIG.2B ABSOLUTE PRESENCE

| |
|---|
| ABSOLUTE PRESENCE ID:1 |
| ABSOLUTE PRESENCE NAME:IN MEETING |
| TRANSFER DESTINATION TELEPHONE NUMBER :0311112222 |
| NO RESPONSE/NO CONDITION FLAG:NO RESPONSE |
| ANSWERING MACHINE FLAG:On |
| CHAT PERMISSION:NOT PERMITTED |
| RELATIVE PRESENCE SETTING TO CSet 0:1 |
| RELATIVE PRESENCE SETTING TO CSet 1:0 |
| RELATIVE PRESENCE SETTING TO CSet 2:0 |
| RELATIVE PRESENCE SETTING TO CSet 3:0 |

FIG.2C RELATIVE PRESENCE

| ID | NAME | PICTOGRAPH CODE | COMMENT |
|---|---|---|---|
| 0 | ARRIVED AT WORK | E056 | |
| 1 | IN MEETING | E059 | BORED |
| 2 | JOINT PARTY | E057 | JOINT PARTY ♪ |
| 3 | PRIVATE BUSINESS | E05A | MISSING |
| ... | | ... | ... |

| COMMUNITY SET ID : 0 | | | | |
|---|---|---|---|---|
| COMMUNITY SET NAME:COMPANY | | | | |
| BUDDY ID | DISPLAY ORDER | BUDDY NAME | CONSENT | SUBSCRIPTION |
| 00000456 | 2 | MR. B | OK | OK |
| 00087654 | 4 | C | OK | OK |
| 00000033 | 3 | MS. D | NG | OK |
| 90000005 | 1 | SECTION CHIEF E | N/A | NG |

COMMUNITY SET

| SIP PHONE PRESENCE | ABSOLUTE PRESENCE |
|---|---|
| IN ATTENDANCE | ARRIVED AT WORK |
| DEPARTED | IN MEETING |
| EATING | LUNCH BREAK |

PRESENCE DISPLAY SYSTEM AND GATEWAY APPARATUS

This application is the U.S. National Phase under 35 U.S.C. §371 of International Application PCT/JP2004/016731, filed on Nov. 11, 2004, which claims priority to Japanese Patent Application No. 2003-432498, filed on Dec. 26, 2003. All publications, patents, patent applications, databases and other references cited in this application, all related applications referenced herein, and all references cited therein, are incorporated by reference in their entirety as if restated here in full and as if each individual publication, patent, patent application, database or other reference were specifically and individually indicated to be incorporated by reference.

TECHNICAL FIELD

The present invention relates to a presence display system capable of displaying the states of other users and to a gateway apparatus.

BACKGROUND ART

In recent years, instant messaging (IM) has attracted attention as communication means on IP networks such as the Internet. IM is a service that combines presence services to permit referencing of the states (presences) of partners such as whether partners are connected to the network and message exchange services that perform character-based conversations in real-time such as chats and progress has been made in standardizing such services (See RFC2778 and RFC2779).

Further, the application of such IM services to mobile phones has also been proposed and Wireless Village, the Mobile Instant Messaging and Presence Services (IMPS) Initiative, which is standards body for IM service-related technology using mobile phones has been established, and common specifications that are also used for the exchange of presence information and messages between Internet-based services instead of between mobile devices have been decided on.

Further, in recent years, there has been a progressive focus on SIP (Session Initiation Protocol)-compliant IP telephone systems, SIP is a signaling protocol for multimedia conferences and VoIP (Voice over Internet Protocol). These SIP-compliant IP telephone systems are also capable of providing presence services (RFC3261).

An SIP-compliant IP telephone system is called an 'SIP phone system' hereinbelow. Further, VoIP clients, which are terminals of an SIP phone system, include multifunctional telephones, PCs and PDAs (soft phones) and so forth comprising SIP-phone client functions, and are referred to collectively as 'SIP phones' or 'SIP phone terminals'.

DISCLOSURE OF THE INVENTION

Problem that the Invention is Intended to Solve

As mentioned earlier, presence display systems comprising mobile phones and SIP phone systems and so forth provide presence services in a variety of systems but such services have hitherto been concluded internally. That is, when their presence has changed, users subscribing to two or more presence services have been required to notify all the presence services to which they are subscribing with respect to changes to their presence. For example, when a user of a presence display system comprising mobile phones arrives at work, the user has been required to notify the SIP phone system installed in the company that they have arrived at work or are in attendance and also notify the presence display system comprising mobile phones to which the user is subscribing of changes to their presence (that they have arrived at work).

Further, when one presence server is not notified of a change in presence, there has been the problem that smooth usage of the presence system is obstructed and highly reliable presence service are not executed.

Therefore, an object of the present invention is to provide a presence display system and gateway apparatus that can be used smoothly and allow the reliability of presence services to be improved.

Means for Solving the Problem

In order to achieve the above object, the presence display system of the present invention is a presence display system which comprises a presence server for managing presence information that is transmitted by each user and which is adapted to report presence information on other designated users to each user, comprising a gateway apparatus that can be connected to a system providing another presence service, wherein, when a user's presence information is changed, the presence server reports information thereon to the system providing another presence service via the gateway apparatus and, when a report to the effect that the user's presence information has changed is received from the system providing another presence service via the gateway apparatus, the presence server establishes synchronization of the user's presence information with the system providing another presence service by updating the user's presence information.

The presence display system further comprises a presence conversion table showing the relationship of correspondence between the presence information of the presence display system and the presence information of the system providing another presence service, wherein synchronization of presence information is established with the system providing another presence service by using the presence conversion table.

In addition, the system providing another presence service is an SIP-compliant IP telephone system, and synchronization of presence information is established with the SIP-compliant IP telephone system through the mutual transmission of an SIP SUBSCRIBE method.

Furthermore, the gateway apparatus of the present invention is a gateway apparatus that connects a presence server of a presence display system and a system providing another presence service, wherein, when the presence information of the user of the presence display system is changed, information thereon is received from the presence server and the system providing another presence service is notified, and, when a report to the effect that the user's presence information has changed is received from the system providing another presence service, synchronization of the user's presence information is established between the presence display system and the system providing another presence service by issuing the report to the presence server.

The gateway apparatus further comprises a presence conversion table showing the relationship of correspondence between the presence information of the presence display system and the presence information of the system providing another presence service, wherein synchronization of the presence information is established by using the presence conversion table.

In addition, the system providing another presence service is an SIP-compliant IP telephone system, and synchronization of presence information is established between the presence server and the SIP-compliant IP telephone system by using an SIP SUBSCRIBE method.

EFFECT OF THE INVENTION

The presence display system and gateway apparatus of the present invention affords the effect that the same presences can be held between a plurality of systems providing presence services, whereby the reliability of presence information improves and the value of services providing the presence information increases.

In addition, operability improves for the user because it is sufficient to notify any one of the plurality of systems providing presence services of a change in presence.

In addition, when a system providing presence services is an SIP phone system, synchronization of presences can be established by using the SIP protocol, and the constitution for establishing synchronization is therefore simple.

BRIEF DESCRIPTION OF THE DRAWINGS

FIG. 2A shows an example of the presence information of a subscriber, which illustrates an example of information that is managed by a presence server 27;

FIG. 2B shows an example of absolute presence information, which illustrates an example of information that is managed by the presence server 27;

FIG. 2C shows an example of relative presence information, which illustrates an example of information that is managed by the presence server 27;

BEST MODE FOR CARRYING OUT THE INVENTION

First, the terms used in this specification will be explained.

A 'buddy' is another user that a certain user has registered in a buddy list. By obtaining a buddy's consent, a user is able to acquire presence information of the buddy and display the buddy's state.

A 'buddy list' is a list of registered buddies. A buddy list may be constituted as one list that includes all the buddies. The buddies may be classified as 'friends', 'family', 'company', 'school', and so forth, and there may be a plurality of 'community sets' that are lists of the buddies in the respective groups. In the embodiment described hereinbelow, a case where a buddy list comprises a plurality of community sets will be described.

An 'owner' is a user who creates and edits a buddy list and watches the presence of buddies.

A 'watcher' is an owner who watches one's own presence. The person indicated is the same as an owner but watcher is a term reflecting the standpoint of a buddy watching the presence.

A 'watcher list' is a list that displays a list of watchers watching one's own presence.

'Presence' is the current state of a user. Presence is set by the user himself. In the system of the present invention, a frequently used presence such as 'arrived at work', 'in a meeting', 'moving', 'resting', 'eating', 'driving', 'sleeping', 'private business', 'does not own a mobile phone', 'unable to connect' is specified in advance as a 'fixed presence' and owners are able to freely set presences (variable presence) in addition to these presences.

The user is able to report the state (presence) of a current caller to friends and acquaintances (watchers) and so forth that have registered the user (caller, presentity) himself as a buddy. Thereupon, the presence set by the caller may be reported as is to a watcher or the presence reported to the watcher may be changed in accordance with the community set to which the watcher belongs. In this case, the presence set by the caller is known as an 'absolute presence' and the presence reported to the watcher in accordance with the community set is known as a 'relative presence'. A 'relative presence' is an apparent presence that can be established in a number corresponding to the number of community sets for one absolute presence. What an owner actually sees is a buddy relative presence.

Figure 1:
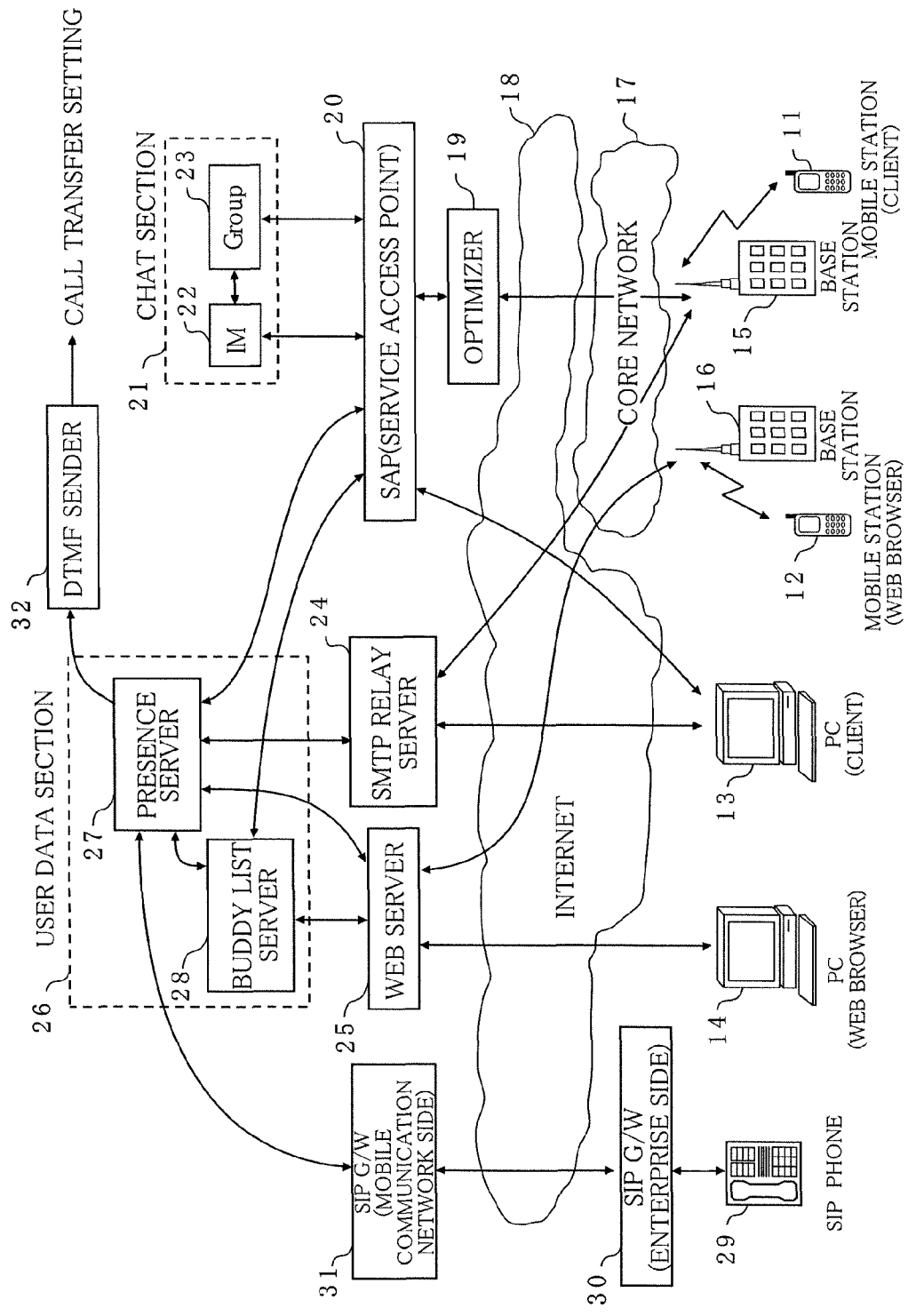
FIG. 1 is a block diagram showing the overall constitution of an embodiment of the presence display system of the present invention.

FIG. 1 shows the overall constitution of an embodiment of the presence display system of the present invention.

In FIG. 1, 11 is a mobile station on which a client program of the presence display system of the present invention runs; 12 is a mobile station in which the client program is not installed; 13 is a personal computer (PC) on which the client program runs; and 14 is a PC on which the client program is not installed. The client program in mobile station 11 is implemented by a Java™ application, for example. Further, as will be described subsequently, the mobile station 13 on which the client program is not installed and the PC 14 on which the client program is not installed are able to execute a portion of the functions of the presence display system of the present invention by using a web browser to connect to the server apparatus (user data section 26) described subsequently. Further, the mobile station 11 and PC 13 on which the client program runs are collectively known as the 'client apparatus', the mobile station 11 is known as the 'mobile station (client)', PC 13 is known as the 'PC (client)', the mobile station 12 is known as the 'mobile station (web browser)', and PC 14 is known as the 'PC (web browser)'.

15 and 16 are base stations of the mobile communication system, 17 is the core network of the mobile communication system, and 18 is an IP network such as the Internet. As illustrated, the mobile stations 11 and 12 are connected to the Internet 18 via the base stations 15 and 16 and the core network 17. Further, PC 13 and PC 14 are connected to the Internet 18.

19 is an optimizer that is inserted between the mobile station 11, which is connected via the core network 17 and the Internet 18, and the service access point (SAP) 20. The optimizer 19 performs mutual conversion of a protocol that is adjusted to minimize mobile station communications by using data compression and so forth, and the protocol handled by the SAP 20. The SAP 20 is a node that plays the role of an interface between a server and client or between a server and another server that are specified by the Wireless Village initiative.

Chat section 21 is a node for providing chat services between mobile stations or between a PC and a mobile station. As shown in FIG. 1, the chat section 21 comprises an IM section 22 that provides IM services and a group section 23 that provides a chat room.

24 is an SMTP (simple mail transfer protocol) relay server for performing mail transfers and provides the function for using mail of the presence display system of the present invention. Mail is used in reporting permission to provide presence information at the time of buddy consent or in reporting an invitation to chat.

25 is a web server that has a function to connect the mobile station 12 and PC 14 and so forth to a user data section 26, which is a server apparatus.

26 is a user data section that has a function for managing subscriber information, presence information, and buddy lists, and so forth and for providing information in accordance with requests. The user data section 26 corresponds to the server apparatus and comprises two function sections, the presence server 27 for managing subscriber information and presence information and so forth for each subscriber that receives services (presence services) provided by the presence display system of the present invention, and the buddy list server 28 that manages the buddy list and so forth of each subscriber. Further, although the two function sections, the presence server 27 and buddy list server 28, are described as being constituted separately here, the two function sections may be constituted as a single device.

Furthermore, 29 is an SIP phone and 30 is an SIP gateway (enterprise side) to which the SIP phone 29 is connected and, accordingly, an SIP-compliant IP telephone system, which is an internal telephone network of the enterprise, for example, is constituted. Here, the SIP gateway (enterprise side) 30 functions as the SIP server of the SIP phone system and also functions as a presence server for holding SIP phone presence information.

31 is an SIP gateway (mobile communication network side) that is connected to the presence server 27 and which is capable of an SIP connection with the SIP gateway (enterprise side) 30 via the Internet 18.

In addition, 32 is a DTMF (Dual Tone Multi-Frequency) sender for automatically changing the transfer destination telephone number in correspondence with presence information that is managed by the presence server 27.

In a system that is constituted thus, the client apparatus (mobile stations 11 and PC 13) accesses the user data section 26 at regular intervals to acquire buddy presence information in order to display presences. This will be called 'standby poling' hereinbelow.

FIG. 2 shows examples of information that are managed by the presence server 27. FIG. 2A is an example of presence information that is stored by the respective subscribing users, FIG. 2B is information relating to the absolute presence of the respective users, and FIG. 2C is information relating to the relative presence of the respective users.

As shown in FIG. 2A, presence information records subsequent information for each user.

A 'subscriber ID' is an ID (identifier) that is allocated uniquely to all users subscribing to the services. By providing subscriber IDs, the same user can be authenticated even if the mobile station number (MSN) of a subscriber changes.

'UID' is a private identification number of a subscriber mobile station. User authentication is performed by acquiring the UID for access by the mobile station.

'MSN' is the telephone number of a subscriber mobile station. The user is made to input the MSN as an ID during login from a PC.

A 'password' is a login password for logging into the service.

A 'PIN' is the personal identification number of the subscriber mobile station.

An 'email address' is the email address of the subscriber mobile station.

An 'SIP phone address' is an SIP phone address when a subscriber user is using the SIP phone system.

'Real name' is text data indicating the name of the subscribing user.

'Nickname' is text indicating the nickname of the subscribing user. The nickname is used as the user's name in a chat or the like or as a default buddy name.

'Selected community set' is the ID of the community set that is currently selected as the target for viewing presences in the client apparatus. Further, in this embodiment, up to four community sets can be registered and the selected community sets have the values 0 to 3.

'Standby poling reception' is a flag showing whether the standby poling by the mobile station 11 has been delivered and is a flag that shows 'OK' if standby is performed up to a time corresponding with the time set by the 'standby poling interval' (a time that is two times this time, for example) and standby poling by the mobile station 11 is delivered up until that time and which shows 'Fail' if standby poling is not delivered up until that time. As a result, it is possible to know that the mobile station 11 is out of range or the power supply thereof is OFF.

The 'standby poling interval' is information that sets the time interval until the next standby poling by the mobile station 11 in seconds. This information is reported during standby poling by the mobile station 11.

The 'presence update time' is the time at which the previous absolute presence settings are updated.

'Absolute presence setting' is an ID for an absolute presence currently set by the subscribing user.

'Temporary comment' is comment text information that can be used temporarily and that can be described when an absolute presence is selected on the client side.

As mentioned earlier, users set their own absolute presence and the relative presence is reported to their buddies. Therefore, the user registers information relating to its own absolute presence and information relating to their relative presence in advance in the presence server 27.

FIG. 2B shows data specifying the absolute presence.

An 'absolute presence ID' is an ID for uniquely identifying an absolute presence.

An 'absolute presence name' is text indicating the name of the absolute presence.

A 'transfer destination telephone number' is the telephone number of the transfer destination when the presence is selected. This is 'Null' when no telephone number has been input.

A 'no response/no conditions flag' is a flag specifying the timing for transferring a call and carries either of the values 'no response' and 'no conditions'. When 'no response' is set, a transfer is made when there is no response to a call to the mobile station. When 'no conditions' is set, a transfer is made immediately without a call being made to the mobile station.

An 'answering machine flag' is a flag specifying whether to perform a call transfer to an answering machine. This flag has either of the values 'On' and 'Off'. When 'On' is set, an answering machine call transfer is performed and, when 'Off' is set, an answering machine call transfer is not performed.

'Chat permission' is a flag to establish whether chat start requests from other users are permitted when their presence is established. This flag has either of the values 'permitted' and 'not permitted'.

As mentioned earlier, a presence that is reported to a buddy is a relative presence that is established in accordance with the community set to which the buddy belongs. Therefore, a relative presence for each community set of each absolute presence is set for the term 'relative presence setting for community set'. In this embodiment, the number of community sets is a maximum of four and, therefore, a presence ID for the relative presence corresponding with each of the four community sets (CSet0 to Cset3) is established.

FIG. 2C shows data that specifies the relative presence.

A 'relative presence ID' is the ID of the relative presence.

A 'relative presence name' is text indicating the name of the relative presence. The association between the absolute presence ID and absolute presence name and the association between the relative presence ID and relative presence name are always the same.

A 'pictograph code' is a pictograph code for designating a pictograph or icon that is displayed when the relative presence is selected. The client apparatus converts the pictograph code to an icon image file.

A 'relative presence comment' is text information that is displayed when the relative presence is selected.

In the example appearing in FIGS. 2B and 2C, when the absolute presence of the user is 'in a meeting' (ID=1), the relative presence 'in a meeting' (ID=1) is reported to buddies that belong to a first community set (CSet0) ('company', for example) and the relative presence 'arrived at work' (ID=0) is reported to buddies belonging to second and third community sets (CSet1 and CSet2) ('friends' and 'family', for example). That is, because there is no need to go as far as informing the family or friends that the user is in a meeting, simply 'arrived at work' is reported. Thus, a presence display suited to the attributes of each of the buddies can be implemented.

The information that is managed by the buddy list server 28 will be described next. 'Community sets', and 'non-subscriber lists' that are buddy lists in which buddies have been registered in a buddy list but who have not yet subscribed to the service are stored in the buddy list server 28. Further, as will be mentioned subsequently, the buddy list server 28 creates a 'watcher list' in accordance with a request from the mobile stations 11 and 12 or PCs 13 and 14 and presents this watcher list to the user.

Figures 3, 4:
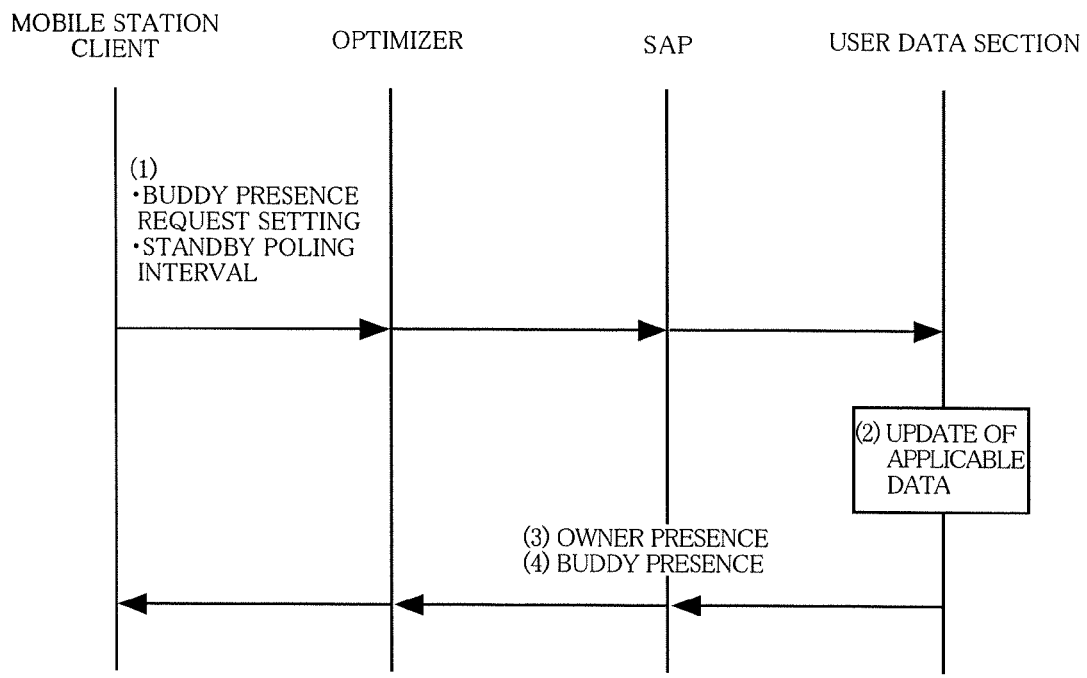
FIG. 3 shows an example of a community set that is managed by a buddy list server 28.
FIG. 4 is a sequence diagram during standby poling.

FIG. 3 shows an example of a 'community set'. As mentioned earlier, the 'community set' is a list in which an owner classifies each of their buddies and which stores a variety of information as illustrated.

A 'community set ID' is an ID for identifying a community set. In this embodiment, four community sets can be established, and the community set ID takes the values of 0 to 3.

A 'community set name' is text indicating the name of a community set.

A 'buddy ID' is the ID of each buddy. A buddy can be uniquely specified through association with a subscriber ID of the presence server or a non-subscriber ID of the non-subscriber list.

The 'display order' is information indicating the buddy display order on the client side. Because the display order is transmitted after being determined by client settings, the display order is stored in the buddy list server.

A 'buddy name' is text information indicating a nickname given to the buddy by an owner.

A 'buddy consent flag (consent)' is a flag that holds information on whether the buddy has permitted to provide the owner with presence and takes any of the values 'OK', 'NG', and 'N/A'. If 'OK', the buddy list server 28 requests and receives presence information of the buddy from the presence server 27. 'NG' indicates a state where presence provision has been denied by the buddy, in which case the buddy list server 28 requests and receives only static information from the presence server 27. 'N/A' indicates a state where the buddy does not subscribe to the service or a state where the granting/non-granting of presence provision has not been reported. The execution of presence provision is then the same as for 'NG'.

A 'service subscription flag (subscription)' is a flag that holds information on whether the buddy has subscribed to the service and takes either of the values 'OK' and 'NG'.

The exchange of data between the client apparatus (mobile station 11, PC13), the mobile station 12 or the PC14 and the user data section 26 when the respective information shown in FIGS. 2 and 3 is updated will be described next.

Standby Poling

First, 'standby poling', in which the client apparatus (mobile station, PC) 11 and 13 access the user data section 26 at fixed intervals will be described.

FIG. 4 is a sequence diagram for when standby poling is performed.

The mobile station (client) 11 knows the time to perform poling from standby poling interval data (in seconds) that is saved in the mobile station 11 and performs poling after standing by for the number of seconds of the standby poling interval after the previous poling.

During poling, the mobile station (client) 11 sends buddy presence request setting information (information indicating a request concerning all members of the buddy list or a request that treats community sets as units) and information on the standby poling interval (seconds) to the optimizer 19 (1). The optimizer 19 decompresses the data that has been compressed and transmitted by the mobile station 11 and sends the decompressed data to the SAP20. The SAP20 transmits the received data to the user data section 26.

Further, in the case of the PC (client) 13 rather than the mobile station 11, the optimizer 19 does not exist in the sequence and communicates directly with the SAP20.

The user data section 26 updates applicable data of the presence information shown in FIG. 2A in accordance with data that have been transmitted by the mobile station 11 via the SAP20 (2).

Further, the user data section 26 transmits (3) the owner's presence (absolute presence setting) and (4) the buddy's presence (relative presence name, relative presence pictograph code, relative presence comment or temporary comment and so forth) to the mobile station 11 via the SAP20 and optimizer 19.

The mobile station (client) 11 performs processing to display the buddy presence on the basis of the received information.

Thus, respective information (dynamic information) such as buddy presence request settings and the standby poling interval are transmitted during standby poling, while information of a low update frequency that need not be acquired each time by poling (called 'static information' hereinbelow) can be updated at any time by the mobile stations 11 and 12 or PCs 13 and 14.

Static information includes absolute presence-related setting information (the respective information of the transfer destination telephone number, 'no response/no conditions flag', 'answering machine flag', 'chat permission', and relative presence setting for community set n), relative presence-related setting information (the respective information of a relative presence pictograph code and relative presence comment), and respective setting information for email addresses, nicknames, the selection of community sets, community set names, display order, and so forth.

When static information is updated by the mobile station client 11, the respective setting information is transmitted to the user data section 26 via the optimizer 19 and the SAP20. The user data section 26 updates the applicable data and sends back the results to the mobile station client 11 via the opposite route to the aforementioned route.

Further, when various setting information is updated by the mobile station 12 or PC14 on which the client program is not installed, the mobile station 12 or PC14 uses a web browser program to transmit various setting information to the user data section 26 via the web browser 25. Accordingly, the user data section 26 updates the applicable data and transmits the setting result to the mobile station 12 or PC14 via the web browser 25.

Thus, the updating of the static information can also be performed by the mobile station 12 or PC14 on which the client program is not installed. As a result, even in the event of complex settings, the update can be made easily by using the PC14 or the like.

Buddy Registration

When the owner is going to register a buddy in the buddy list, the owner selects a partner (buddy) who is thought to want their presence watched from the address book stored in the mobile station. As a result, information such as the real name, furigana, mobile station number (MSN), email address, and nickname of the selected buddy as well as the community set to which the selected buddy belongs is read from the address book and transmitted to the user data section 26 via the optimizer 19 and SAP20.

The user data section 26 registers information on the buddy in the buddy list (community set) on the basis of the transmitted information. Here, with the telephone number of the buddy serving as a key, the user data section 26 performs a search to determine whether a buddy that has requested registration is a subscriber to the service by comparing the buddy's telephone number with the MSN of service subscribers. When the buddy is a non-subscriber, the user data section 26 sets the 'service subscriber flag' to 'NG' and the 'buddy consent flag' to 'N/A' and registers the buddy's information in the non-subscriber list.

On the other hand, when the buddy is a subscriber to the presence services, the user data section 26 sends an email requesting consent for presence provision to the buddy's mobile station via an SMTP relay server. When the buddy that has seen the mail has given consent to the owner for presence provision, the 'buddy consent flag' is set to 'OK' and, when presence provision is denied, the buddy consent flag is set to 'NG'.

Thus, information such as the community set and non-subscriber list shown in FIG. 3 is created.

Further, the changing of the buddy's name, movement of the community set to which the buddy belongs, and deletion of the buddy and so forth can be performed instantly by the mobile station 11 or 12.

Changing of Absolute Presence Settings

Absolute presence settings are changed when an owner's state has changed. The changing of the absolute presence settings can be performed by the mobile station 11 or 12.

Figure 5:
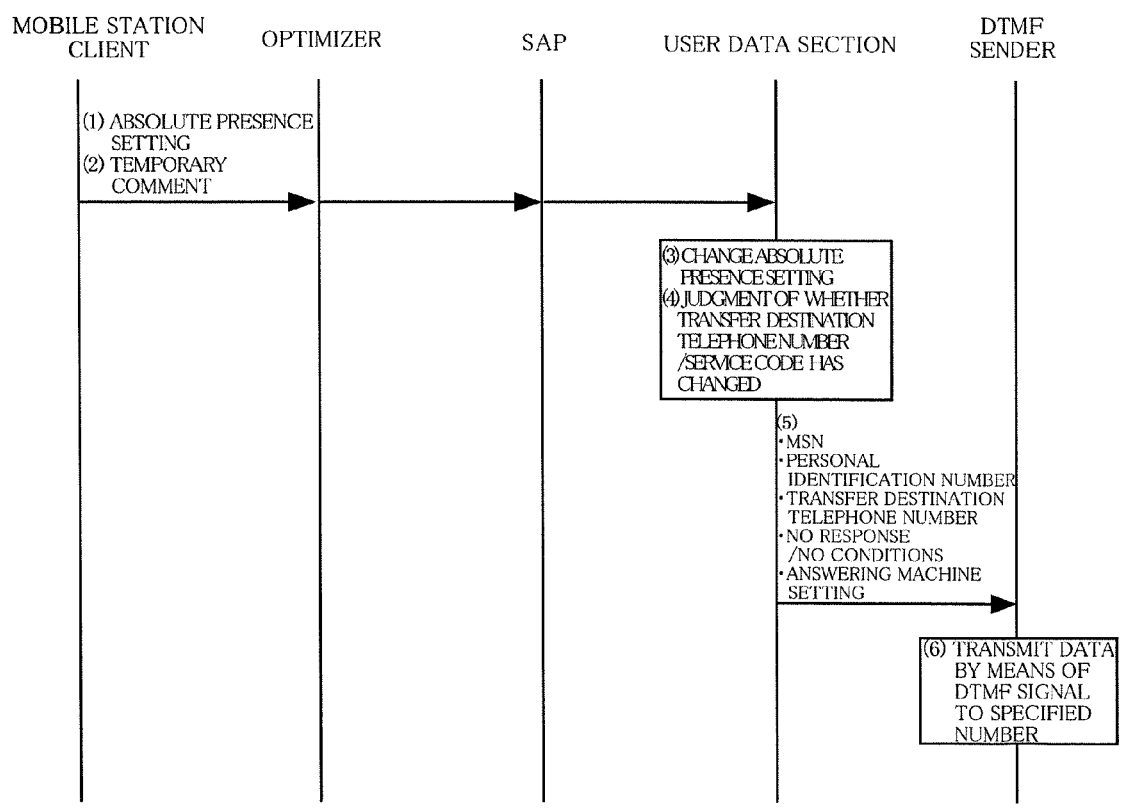
FIG. 5 is a sequence diagram for when an absolute presence is changed.

FIG. 5 is a sequence diagram for when the absolute presence has changed.

When the absolute presence has changed, the user of the mobile station (client) 11 operates the mobile station (client) 11 and changes the absolute presence setting, that is, transmits the ID of the changed absolute presence to the optimizer 19 (1). At the same time, when a temporary comment is input, the temporary comment is also transmitted to the optimizer 19 (2). The optimizer 19 decompresses data that has been compressed and transmitted by the mobile station 11 and transmits the data to the SAP20. The SAP20 transmits the data thus sent to the user data section 26. The presence server 27 of the user data section 26 updates the absolute presence setting in the presence information shown in FIG. 2A with the ID of the absolute presence thus sent (3). Further, the presence server 27 references the absolute presence information (FIG. 2B), judges whether there have been any changes to service codes for the transfer destination telephone number, no response/no conditions, answering machine setting, and so forth (4) and, when there has been a change, information such as the MSN, personal identification number, transfer destination telephone number, no response/no conditions, and answering machine setting and so forth (5) is transmitted to a DTMF sender 32. The DTMF sender 32 transmits data applicable to a specified telephone number that is specified in advance (5) by means of a DTMF signal. As a result, changes to the telephone number of the transfer destination and so forth can be reflected.

Further, by accessing the user data section 26 via a web server 25, the mobile station (web browser) 12 is able to change the absolute presence setting.

Watcher List

As mentioned earlier, the buddy list server 28 has a function to create and send back a 'watcher list' that shows a list of owners watching one's own presence in accordance with a request from the client apparatus, mobile station 12 and PC14.

The user data section 26 that received the watcher list acquisition request from the mobile station 11 searches for a buddy list (community set) stored on the buddy list server 28 and creates a list of the users (watchers) that have registered the user of the mobile station 11 as a buddy. The created watcher list is then transmitted to the mobile station 11 that issued the request and displayed on the screen of the mobile station 11.

The user, who is a caller (presentity), sees the displayed watcher list and is able to change the settings so that presence provision is denied for individual watchers. For example, by performing an operation to select a watcher on the watcher-list display screen and cancel the provision of presence information for the watcher, setting information for the watcher for which the disclosure setting of the watcher is changed is transmitted to the user data section 26 via the optimizer 19 and SAP20 and the user data section 26 rewrites the buddy consent flag for the user of the buddy list (community set) of the corresponding watcher as 'NG' on the basis of the received information.

The watcher list can likewise be acquired by the PC (client) 13. In addition, a request for the watcher list can also be sent to the user data section 26 via the web server 25 by the mobile station (web browser) 12 and PC (web browser) 14 on which the client program is not installed, whereby the disclosure setting of the watcher can be changed.

Thus, the user acquires a list of the watchers watching the user's own presence and, in a state where the watcher list is displayed, the user is able to perform an operation to change the presence disclosure settings for the watchers.

Presence Display

Figure 6A:
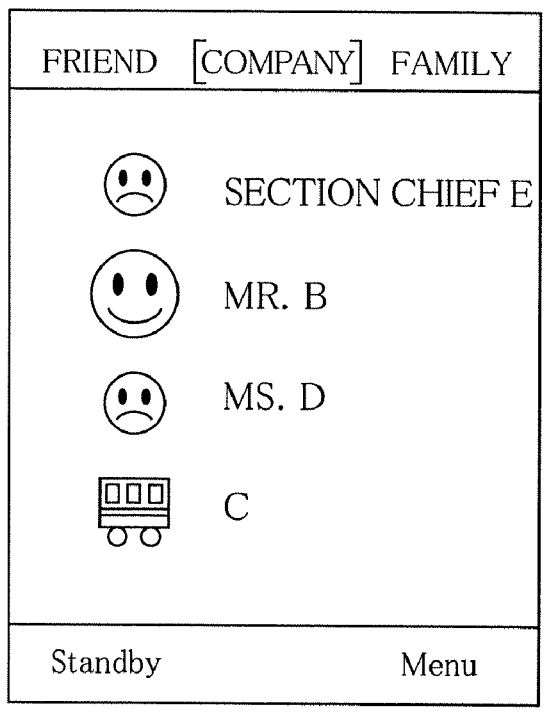
FIG. 6A shows an example of a screen on which a buddy list is displayed, which illustrates a state where buddy presences are displayed.

FIG. 6A shows an aspect in which the presence of a buddy of a selected community set is displayed on the screen of the mobile station by means of standby poling. In the illustrated example, there is a buddy list for each of the community sets that are classified as 'friends', 'company', and 'family' and an aspect where buddies belonging to the 'company' community set is displayed is shown.

In the illustrated example, an area where the presence is displayed as an icon and an area where the name (nickname) is displayed are established for each buddy. Here, because 'section chief E' is a non-subscriber and the buddy consent flag of 'Ms. D' is NG (FIG. 3), corresponding icons are displayed. Further, the presences of 'Mr. B' and 'C' respectively are displayed by means of icons. In this example, it can be seen that 'C' is moving. Further, a buddy is out of range, '?' is displayed in the area in front of the icon and the fact that the buddy is out of range can be displayed by thinly displaying the name of the buddy.

Figure 6B:
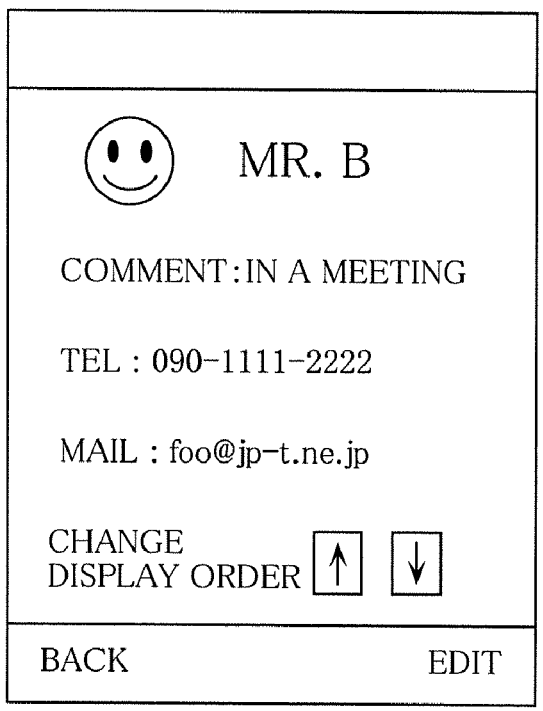
FIG. 6B shows an example of a screen displaying the detailed presence of a selected buddy, which illustrates a state where the presence of the buddy is displayed.

Furthermore, when presences are displayed as per FIG. 6A, the detailed presence of a selected buddy can be displayed. FIG. 6B shows an aspect in which buddy 'Mr. B' in FIG. 6A is selected and the detailed presence thereof is displayed.

As illustrated in FIG. 6B, the buddy's comments, telephone number, and mail address are displayed. In addition, a button for changing the display order of the buddies is displayed and, by operating this button, setting information for changing the display order of the buddies can be transmitted to the buddy list server 28.

Synchronization with SIP Phone Presence

The presence display system of the present invention is constituted to be able to establish presence synchronization between absolute presences that are recorded in the presence server 27 and SIP phone presences of an SIP phone system comprising the SIP phone 29 and the SIP gateway (enterprise side) 30. That is, when the absolute presences or SIP phone presences are changed, the presence server 27 and SIP gateway (enterprise side) 31 implement presence cooperation as a result of mutual knowledge of changes in presence via the SIP gateway (mobile communication network side) 31. Further, because cases where items of the absolute presence and SIP phone presence do not match are assumed, notification that conversion to a suitable presence is possible by referencing a conversion table (presence conversion table) is provided.

First, a case where an SIP phone presence is changed and a presence change notification is issued to the presence server 27 of the user data section 26 will be explained. In this example, an 'arrived at work' notification is sent to the presence server 27 when the SIP phone presence is changed to 'in attendance'.

Figure 7:
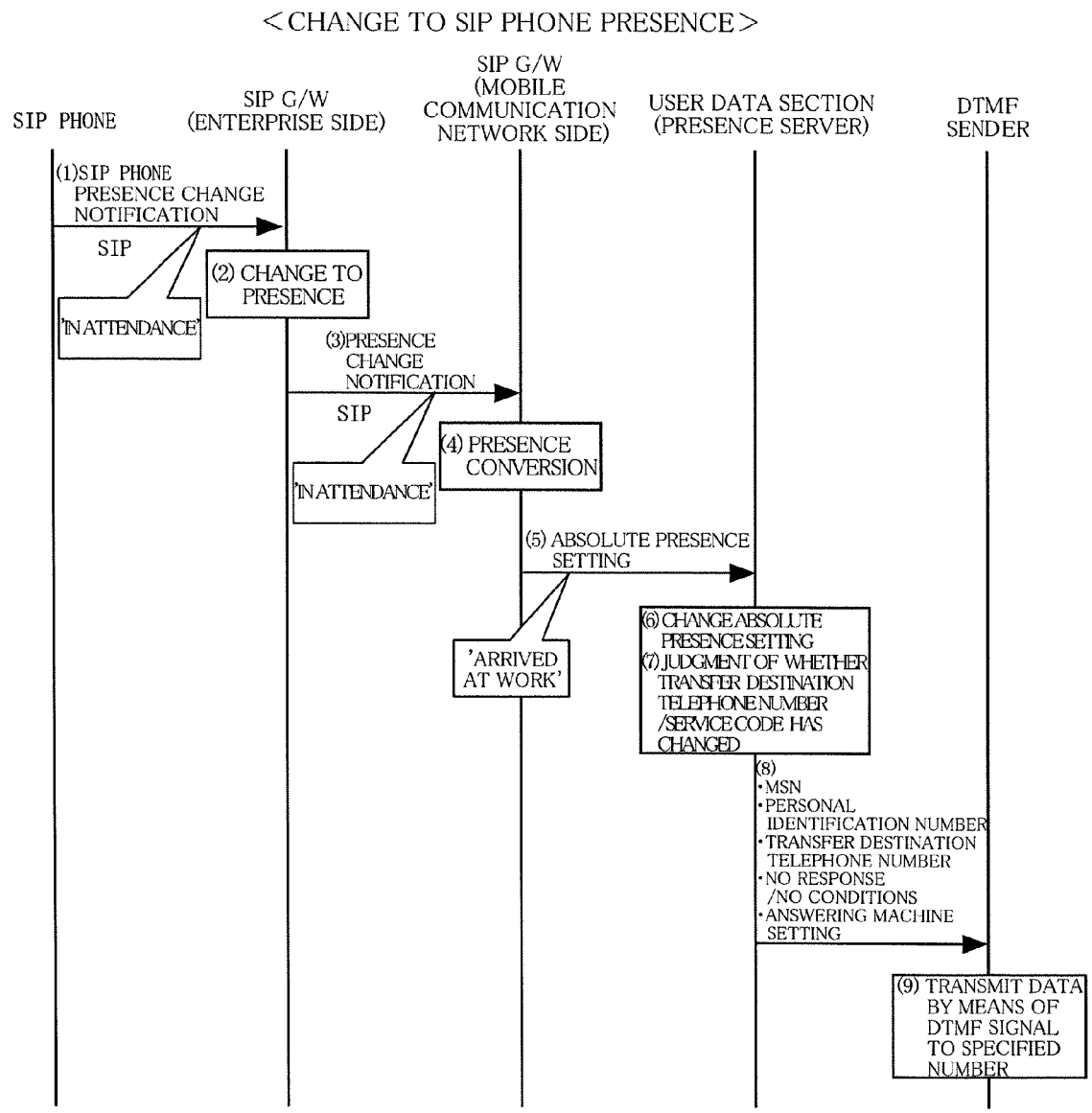
FIG. 7 is a sequence diagram for when an SIP phone presence is changed.

FIG. 7 is a sequence diagram for when an SIP phone presence is changed.

When the user changes the SIP phone presence, the SIP phone 29 transmits an SIP phone presence change notification ('in attendance') to the SIP gateway (enterprise-side) 30 (1).

When the SIP gateway (enterprise side) 30 receives the SIP phone presence change notification, the SIP phone presence managed by the SIP gateway (enterprise side) is changed to 'in attendance' (2).

The SIP gateway (enterprise side) 30 then sends the presence change notification ('in attendance') to the SIP gateway (mobile communication network side) 31 (3).

The SIP gateway (mobile communication network side) 31 receives the presence change notification ('in attendance') and performs presence conversion (conversion from 'in attendance' to 'arrived at work' in this example) (4).

Further, the SIP gateway (mobile communication network side) 31 sends a presence change notification ('arrived at work') to the user data section 26 (5).

The user data section 26 changes the absolute presence to 'arrived at work' (6) and judges whether the transfer destination telephone number or service code or the like has been changed as a result (7). When the transfer destination telephone number or service code or the like has been changed, information such as the MSN, personal identification number, transfer destination telephone number, no response/no conditions, answering machine settings and so forth is transmitted to the DTMF sender 32 (8). The DTMF sender 32 transmits data applicable to a specified telephone number that is specified in advance by means of a DTMF signal (9).

Thus, when the SIP phone presence has been changed by the SIP phone 29, the absolute presence of the user data section 26 (presence server 27) of the presence display system is changed.

A case where the absolute presence of the presence server 27 is changed and the SIP phone presence is changed will be described next. In this example, the absolute presence is changed to 'in a meeting' and the SIP phone presence is changed to 'departed'.

Figures 8, 9:
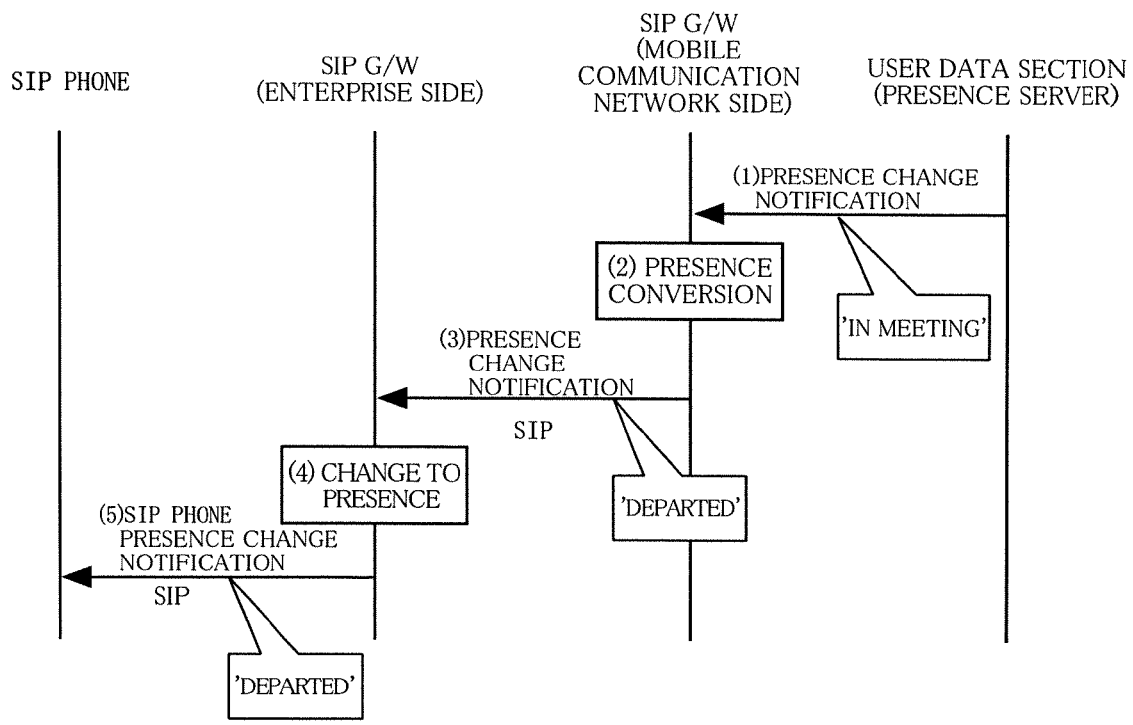
FIG. 8 is a sequence diagram for when an absolute presence of the presence server 27 is changed.
FIG. 9 shows an example of a presence conversion table.

FIG. 8 is a sequence diagram for when an absolute presence of the presence server 27 is changed.

When the absolute presence is changed to 'in a meeting' as a result of changing the absolute presence settings (FIG. 5), the presence server 27 of the user data section 26 sends a presence change notification ('in a meeting') to the SIP gateway (mobile communication network side) 31 (1).

Upon receipt of the presence change notification, the SIP gateway (mobile communication network side) 31 performs a presence conversion (a conversion from 'in a meeting' to 'departed' in this example) (2), and sends a presence change notification ('departed') to the SIP gateway (enterprise side) 30 (3).

Upon receipt of the presence change notification ('departed'), the SIP gateway (enterprise side) 30 changes the SIP phone presence managed by the SIP gateway (enterprise side) 30 (4). The SIP gateway (enterprise side) 30 then sends an SIP phone presence change notification ('departed') to the SIP phone terminal 29 (5).

Thus, when there has been a change to the absolute presence, the SIP phone presence is also changed.

FIG. 9 shows an example of a presence conversion table that is referenced at the time of the presence conversion.

In the example shown in FIG. 9, the SIP phone presences 'in attendance', 'departed', and 'eating', and the absolute presences 'arrived at work', 'in a meeting', and 'lunch break' of the presence server 27 respectively are associated. Thus, conversion to presences that match the respective presence services is performed.

Figure 10:
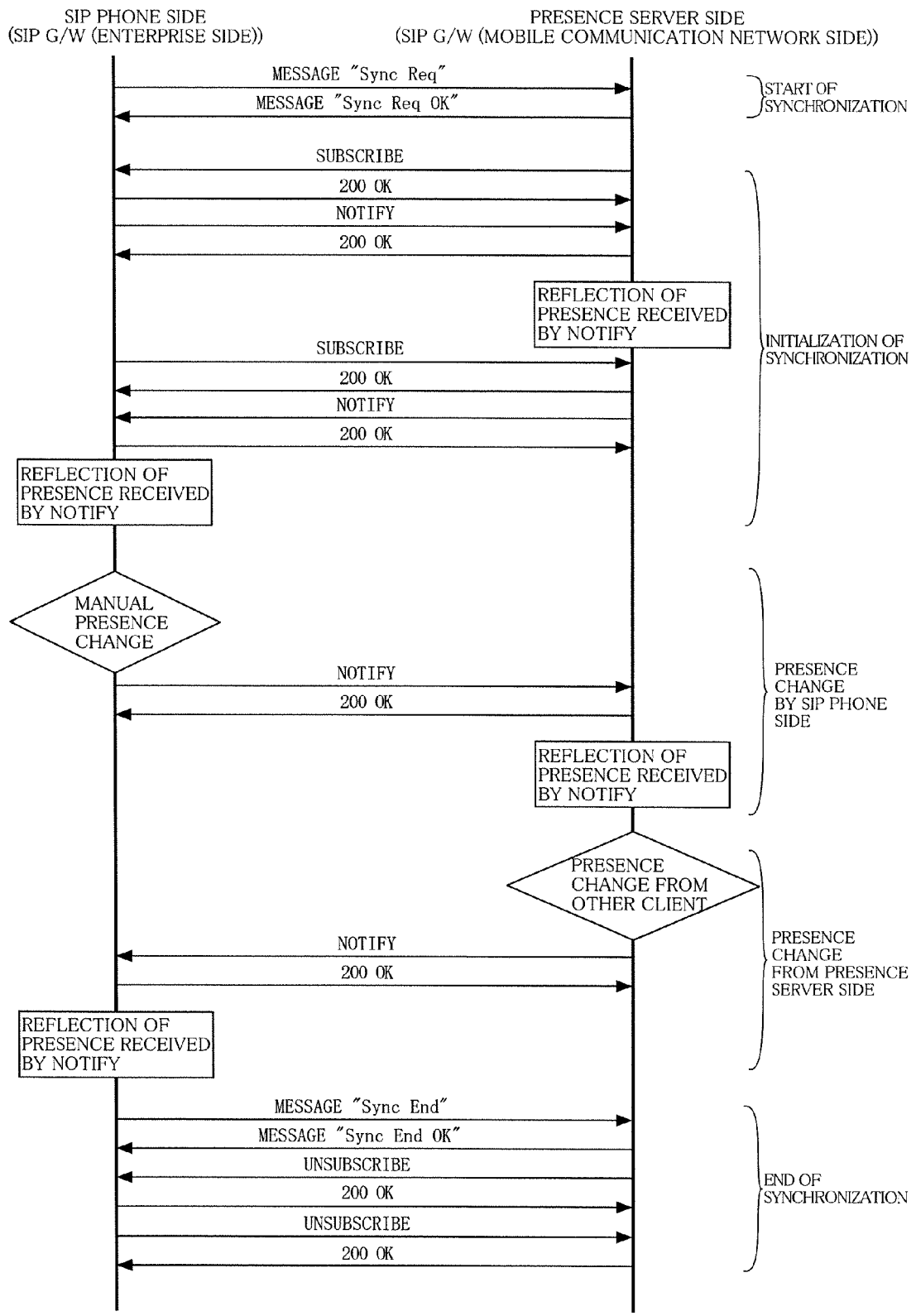
FIG. 10 is a sequence diagram illustrating the detailed operation of presence synchronization between the SIP phone side and the presence server side.

FIG. 10 is a sequence diagram of processing that establishes presence synchronization between the SIP phone side (specifically, the SIP gateway (enterprise side) 30) and the presence server side (specifically, the SIP gateway (mobile communication network side) 31 and the presence server 27).

As illustrated in FIG. 10, presence synchronization is established by using the SIP protocol by means of the procedure below between the SIP gateway (mobile communication network side) 31 that received the instruction of the presence server 27 and the SIP gateway (enterprise side) 30.

1. The SIP phone side (SIP gateway (enterprise side) 30) with which synchronization is to be established sends a message 'Sync Req' to the presence server side by using the MESSAGE method. Upon receipt of the 'Sync Req', the presence server side sends a message 'Sync Req OK' to the SIP phone side by means of the MESSAGE method (start of synchronization).

2. Upon receipt of the 'Sync Req' message, the presence server side issues a SUBSCRIBE method to the SIP phone side. Upon receipt of the SUBSCRIBE method, the SIP phone side transmits the current presence to the presence server side together with the SIP phone address by means of the NOTIFY method. The presence server 27 that receives the NOTIFY method then rewrites its own presence information by making the presence described in the NOTIFY the current presence of the subscriber user with the SIP phone address.

3. Upon receipt of a code 200 response to NOTIFY in 2 above, the SIP phone side issues a SUBSCRIBE method to the presence server side. Upon receipt of the SUBSCRIBE method, the presence server 27 transmits the saved presence to the SIP phone side together with the SIP phone address of the subscriber user by means of the NOTIFY method.

The SIP phone side, which receives the NOTIFY method, then rewrites its own presence information with the presence described in the NOTIFY serving as the current presence (however, for the procedure in 2 above, the presence of the SIP phone is not actually changed).

Accordingly, initialization synchronization of the presences of the presence server 27 and the SIP phone side is effected and the subsequent synchronization preparations are completed (initialization of synchronization).

4. When the user has changed the presence of the SIP phone, the NOTIFY method is transmitted from the SIP phone side to the presence server side. The presence server 27, which has received the NOTIFY method including the changed presence and the SIP phone address of the subscriber rewrites its own presence information with the presence described in the NOTIFY as the current presence (presence change from the SIP phone side).

5. When another client device (the mobile stations 11 and 12 and the PC13 and PC14) has changed a presence of the presence server 27, the presence server side transmits the saved presence to the SIP phone side together with the SIP phone address of the user by means of a NOTIFY method. The SIP phone side that has received the NOTIFY method rewrites its own presence information with the presence described in the NOTIFY serving as the current presence (presence change from the presence server side).

6. When the effective time limit for both SUBSCRIBE methods has expired, re-initialization is performed by re-executing the initialization procedure (2 to 3 above). Further, when the SIP phone-side SUBSCRIBE effective time limit has previously expired, the order of 2 and 3 is reversed.

7. In order to end the synchronization operation, a 'Sync End' message is transmitted from the SIP phone side to the presence server side by means of a MESSAGE method. Upon receipt of the 'Sync End' message, the presence server side first sends back a 'Sync End OK' message to the SIP phone side by means of the MESSAGE method and then ends the presence acquisition by the SIP phone side by issuing an UNSUBSCRIBE method.

After the SIP phone side has transmitted the 'Sync End' message, the SIP phone side ends the presence acquisition by the presence server side by issuing an UNSUBSCRIBE method to the presence server side (end of synchronization).

Further, when a change in presence has been executed by the presence server side, presence synchronization is performed in the reverse order to that above.

Although the SIP gateway (enterprise side) 30 was described in the above description as having a presence server for managing SIP phone presences, there may be cases where the SIP phone 29 itself holds the SIP phone presences. In this case, presence synchronization is possible as a result of a SUBSCRIBE method being mutually sent between the SIP phone 29 and SIP gateway (mobile communication network side) 31.

Figure 11:
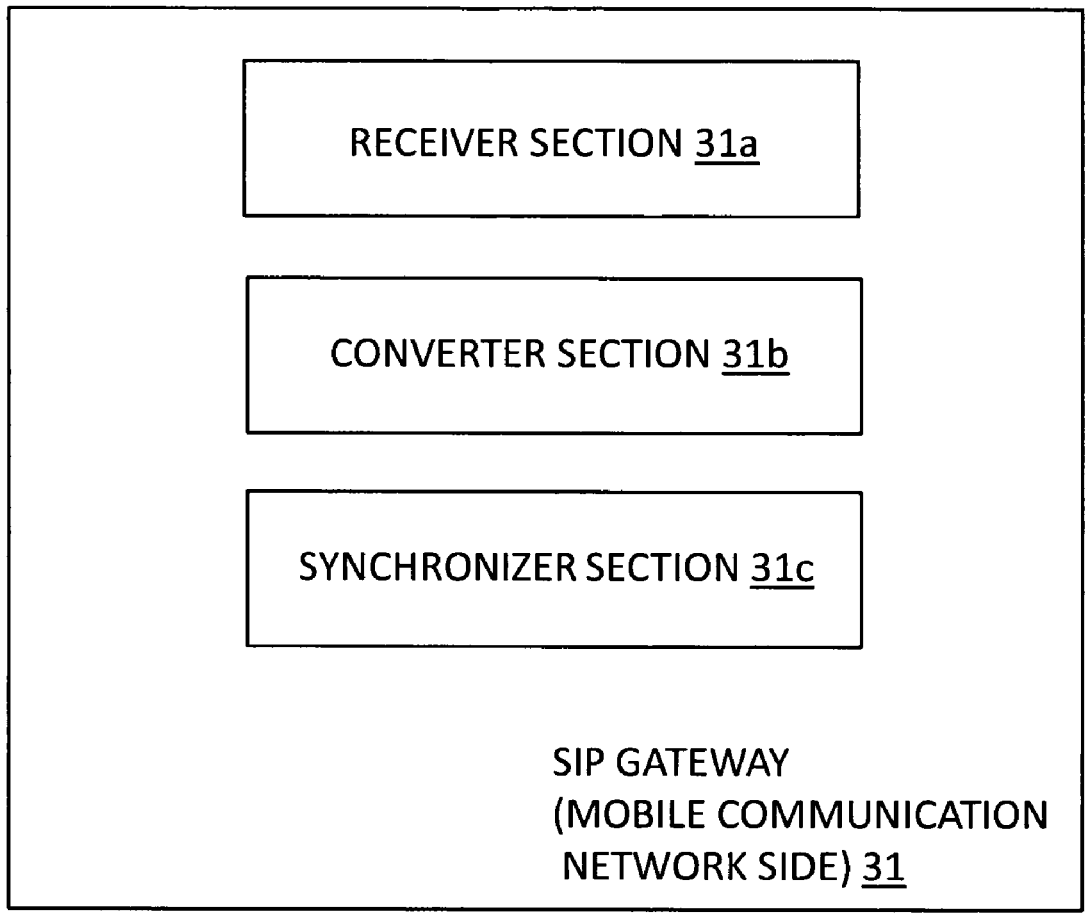
FIG. 11 is a schematic diagram showing sections of the SIP gateway (mobile communication network side) 31 that functionally operate corresponding to the sequence diagrams of FIGS. 7 and 8.

FIG. 11 is a schematic diagram showing sections of the SIP gateway (mobile communication network side) 31 that functionally operate corresponding to the sequence diagrams of FIGS. 7 and 8. A receiver section 31a receives a presence change notification for a user from one of the SIP phone system (comprised of the SIP phone 29 and SIP gateway (enterprise side) 30) or the presence server 27 of the user data section 26 when the presence information of the user is changed. A converter section 31b converts the presence change notification. A synchronizer section 31c provides the converted presence change notification to the other of the SIP phone system 29/30 or the presence server 27 to synchronize the presence information between the SIP phone system and the presence server 27.

Moreover, an embodiment for synchronizing presences between SIP phones and presence services of a mobile communication system was described in the above description. However, the present invention is not limited to such an embodiment and can be similarly adapted to cases where presence synchronization is established between the presence services of a mobile communication system and other presence services, between SIP phones, or between SIP phone presence servers, and so forth.

The invention claimed is:

1. A gateway apparatus that connects a presence server of a first system and a second system providing another presence system, comprising:

a receiver section that receives first presence information for a given user from one of:
the first system and the second system when user presence information of the given user is changed;

a converter section that converts the first presence information to second presence information, wherein the second presence information is compatible with the other of: the first system and the second system, and wherein, independent of protocol format of the first presence information and the second presence information, content of the first presence information is different from content of the second presence information, the content of the first presence information including at least a first field having a first value that is different from a corresponding value of a corresponding field of the content of the second presence information, each of the content of the first presence information and the content of the second presence information corresponding to the change in the user presence information; and a synchronizer section that provides the second presence information to the other of: the first system and the second system, wherein the second presence information synchronizes the user presence information of the given user in the first system and the second system.

2. The gateway apparatus according to claim 1, further comprising:

a presence conversion table associating the user presence information of the first system with the user presence information of the second system, wherein the converter section uses the presence conversion table to convert the first presence information to the second presence information.

3. The gateway apparatus according to claim 1, wherein the second system is a Session Initiation Protocol (SIP) compliant IP telephone system, and wherein the gateway apparatus uses an SIP SUBSCRIBE method when communicating with the second system.

4. The gateway apparatus according to claim 2, wherein the second system is a Session Initiation Protocol (SIP) compliant IP telephone system, and wherein the gateway apparatus uses an SIP SUBSCRIBE method when communicating with the second system.

5. A presence display system, comprising:
a presence server; and
a gateway apparatus that connects a first system, having the presence server, and a second system providing another presence system, the gateway apparatus including:
a receiver section that receives first presence information for a given user from one of: the first system and the second system when user presence information of the given user is changed;
a converter section that converts the first presence information to second presence information, wherein the second presence information is compatible with the other of: the first system and the second system, wherein, independent of protocol format of the first presence information and the second presence information, content of the first presence information is different from content of the second presence information, the content of the first presence information including at least a first field having a first value that is different from a corresponding value of a corresponding field of the content of the second presence information, each of the content of the first presence information and the content of the second presence information corresponding to the change in the user presence information; and
a synchronizer section that provides the second presence information to the other of: the first system and the second system, wherein the second presence information synchronizes the user presence information of the given user in the first system and the second system,
wherein the presence server manages the user presence information of the given user by at least one of:
reporting the user presence information of the given user to the second system, via the gateway apparatus, when the user presence information of the given user is changed in the first system; and
updating the user presence information of the given user in the first system when a report that the user presence information of the given user has changed is received from the second system via the gateway apparatus.

6. The presence display system according to claim 5, further comprising:
a presence conversion table associating the user presence information of the first system with the user presence information of the second system, wherein the converter section uses the presence conversion table to convert the first presence information to the second presence information.

7. The presence display system according to claim 6, wherein the second system is a Session Initiation Protocol (SIP) compliant IP telephone system, and wherein the gateway apparatus uses an SIP SUBSCRIBE method when communicating with the second system.

8. The presence display system according to claim 5, wherein the second system is a Session Initiation Protocol (SIP) compliant IP telephone system, and wherein the gateway apparatus uses an SIP SUBSCRIBE method when communicating with the second system.

9. The presence display system according to claim 5, wherein the presence server further manages the user presence information of the given user by reporting updated presence information to buddies of the given user, wherein the buddies are in at least one of: the first system and the second system.

10. A method for connecting a first system, having a presence server, and a second system providing another presence system, the method comprising:
receiving first presence information for a given user from one of: the first system and the second system, when user presence information of the given user is changed;
converting the first presence information to second presence information, wherein the second presence information is compatible with the other of: the first system and the second system, and wherein, independent of protocol format of the first presence information and the second presence information, content of the first presence information is different from content of the second presence information, the content of the first presence information including at least a first field having a first value that is different from a corresponding value of a corresponding field of the content of the second presence information, each of the content of the first presence information and the content of the second presence information corresponding to the change in the user presence information; and
providing the second presence information to the other of: the first system and the second system, wherein the second presence information synchronizes the user presence information of the given user in the first system and the second system.

11. The method according to claim 10, further comprising:
providing a presence conversion table associating the user presence information of the first system with the user presence information of the second system, wherein the presence conversion table is used to convert the first presence information to the second presence information.

12. The method according to claim 10, wherein the second system is a Session Initiation Protocol (SIP) compliant IP telephone system, and wherein an SIP SUBSCRIBE method is used when communicating with the second system.

13. The method according to claim 10, further comprising:
reporting the user presence information of the given user to the second system when the user presence information of the given user is changed in the first system.

14. The method according to claim 10, further comprising:
updating the user presence information of the given user in the first system when a report that the user presence information of the given user has changed is received from the second system.

15. The method according to claim 10, further comprising:
reporting updated presence information to buddies of the given user, wherein the buddies are in at least one of: the first system and the second system.

* * * * *